US012759318B2

(12) United States Patent
Aruga et al.

(10) Patent No.: US 12,759,318 B2
(45) Date of Patent: Oct. 13, 2026

(54) RECORDING DEVICE

(71) Applicant: SEIKO EPSON CORPORATION, Tokyo (JP)

(72) Inventors: Sho Aruga, Chino (JP); Nobuhiko Shinozaki, Okaya (JP); Haruki Miyasaka, Matsumoto (JP); Tomoya Kurashina, Shiojiri (JP); Soshi Okawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 18/957,983

(22) Filed: Nov. 25, 2024

(65) Prior Publication Data

US 2025/0170836 A1 May 29, 2025

(30) Foreign Application Priority Data

Nov. 27, 2023 (JP) ................................ 2023-199660

(51) Int. Cl.

*B41J 11/14* (2006.01)
*B41J 2/165* (2006.01)
*B41J 11/02* (2006.01)
*B41J 11/06* (2006.01)
*B41J 13/03* (2006.01)

(52) U.S. Cl.

CPC ........... *B41J 11/14* (2013.01); *B41J 2/16508* (2013.01); *B41J 2/16511* (2013.01); *B41J 11/02* (2013.01); *B41J 11/06* (2013.01); *B41J 13/03* (2013.01)

(58) Field of Classification Search

CPC .... B41J 11/14; B41J 2/16508; B41J 2/16511; B41J 11/02; B41J 11/06; B41J 13/03
See application file for complete search history.

(56) References Cited

U.S. PATENT DOCUMENTS 7,527,349 B2 * 5/2009 Jung .................... B41J 2/16547 347/29

FOREIGN PATENT DOCUMENTS

JP 2006-056047 A 3/2006

* cited by examiner

*Primary Examiner* — Geoffrey S Mruk
(74) *Attorney, Agent, or Firm* — WORKMAN NYDEGGER

(57) ABSTRACT

A recording device includes a facing section in which an opening section is formed at a position facing the liquid ejecting head, and a shutter which is movable between a covering position at which the opening section is covered and an open position at which the opening section is opened, and which supports a medium passing through the position facing the liquid ejecting head when the shutter is at the covering position. The shutter includes a plurality of movement sections along a movement direction, two adjacent movement sections are pivotably connected to each other, and at least one movement section of the shutter takes an inclined posture with respect to the liquid ejection surface when the shutter is at an open position.

9 Claims, 14 Drawing Sheets

RECORDING DEVICE

The present application is based on, and claims priority from JP Application Serial Number 2023-199660, filed Nov. 27, 2023, the disclosure of which is hereby incorporated by reference herein in its entirety.

BACKGROUND

1. Technical Field

The present disclosure relates to a recording device that performs recording on a medium.

2. Related Art

JP-A-2006-056047 discloses an inkjet printer including a line type head having a nozzle array which ejects liquid droplets of a plurality of colors, a platen which supports recording paper from the rear side, and a cap which caps the line type head. In the inkjet printer, an opening is formed in the platen in the width direction of the line type head, and a shutter which opens and closes the opening is provided.

During recording, the shutter is in a state where it closes the opening of the platen, and during cleaning or capping, the shutter moves to open the opening so that the line head and the cap are in a state facing each other.

Transport roller pairs are provided upstream and downstream of the platen in the transport direction.

In the inkjet printer described in JP-A-2006-056047, it is necessary to keep the transport roller pair away from the line head in order to secure a space for the movement of the shutter, and thus the device is increased in size.

SUMMARY

In order to solve the above-mentioned problems, a recording device of the present disclosure includes a liquid ejection head that performs recording by ejecting liquid onto a medium; a facing section arranged to face the liquid ejection head, with an opening section formed at a position facing the liquid ejection head; a cap section that is exposable through the opening section and that covers the liquid ejection surface of the liquid ejection head; and a shutter configured to move between a covering position at which the shutter covers the opening section and an open position at which the shutter opens the opening section, the shutter supporting a medium passing through a position facing the liquid ejecting head when the shutter is at the covering position, wherein the shutter includes a plurality of movement sections along a movement direction, and two adjacent movement sections are pivotably coupled to each other and when the shutter is in the open position, at least one of the movement sections takes an inclined posture with respect to the liquid ejection surface.

DESCRIPTION OF EMBODIMENTS

Figure 1:
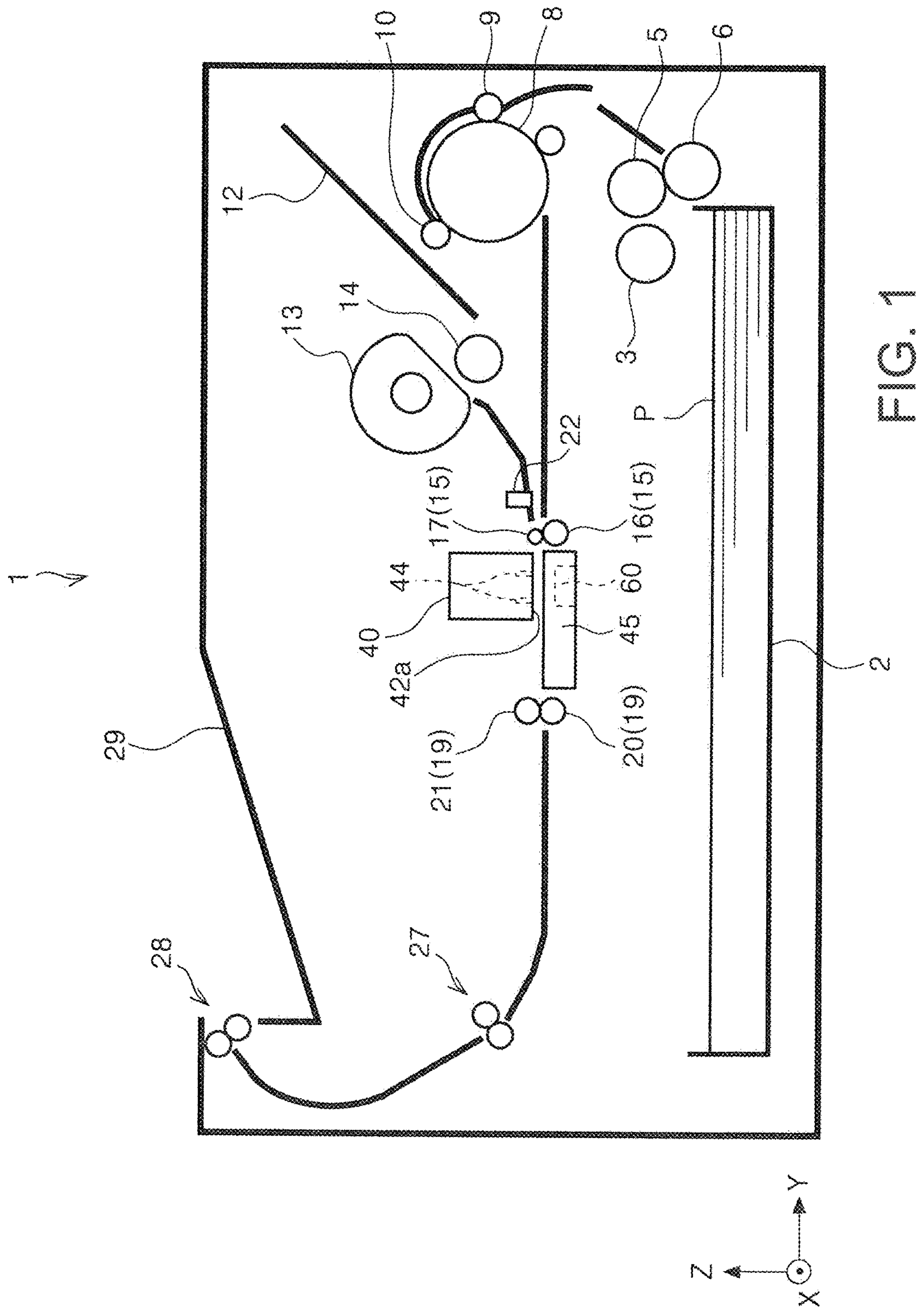
FIG. 1 is a view illustrating an entire medium transport path of a printer.

Hereinafter, the present disclosure will be schematically described.

A recording device according to a first aspect includes a liquid ejection head that performs recording by ejecting liquid onto a medium; a facing section arranged to face the liquid ejection head, with an opening section formed at a position facing the liquid ejection head; a cap section that is exposable through the opening section and that covers the liquid ejection surface of the liquid ejection head; and a shutter configured to move between a covering position at which the shutter covers the opening section and an open position at which the shutter opens the opening section, the shutter supporting a medium passing through a position facing the liquid ejecting head when the shutter is at the covering position, wherein the shutter includes a plurality of movement sections along a movement direction, and two adjacent movement sections are pivotably coupled to each other and when the shutter is in the open position, at least one of the movement sections takes an inclined posture with respect to the liquid ejection surface.

According to the present aspect, in a case where the shutter is positioned at the open position, it is possible to reduce an occupied space of the shutter in a direction parallel to the liquid ejection surface, that is, in the medium transport direction at a position facing the liquid ejection surface. As a result, it is possible to suppress an increase in size of the apparatus in the medium transport direction.

A second aspect is an aspect dependent on the first aspect, the plurality of movement sections includes a first movement section and a second movement section located downstream of the first movement section in the medium transport direction and when it is in the open position, the first movement section is inclined posture with respect to the liquid ejection surface, and the second movement section is parallel to the liquid ejection surface.

In the present aspect, when the shutter is in the open position, the first movement section is in an inclined posture with respect to the liquid ejection surface, and the second movement section is parallel to the liquid ejection surface. By this, compared to a configuration in which both the first movement section and the second movement section are inclined posture with respect to the liquid ejection surface, it is possible to suppress the space occupied by the shutter in the normal line direction with respect to the liquid ejection surface.

A third aspect is according to the second aspect, the recording device includes a guide member configured to guide the shutter in the movement direction, wherein the movement section includes the guided section guided by a guide groove formed in the guide member on both side sections in a width direction, which is a direction intersecting the medium transport direction, the guide groove includes a first groove section extending parallel to the liquid ejection surface, a second groove portion that is located downstream of the first groove section in the medium transport direction and that extends in a direction inclined with respect to the liquid ejection surface, and a third groove section that is located downstream of the second groove section in the medium transport direction and that extends parallel to the liquid ejection surface, the first movement section includes a plurality of the guided sections provided along the movement direction, and when the shutter is positioned in the open position, the guided section provided to the second movement section is positioned in the third groove portion and A plurality of the guided sections included in the first movement section may be separately positioned in a plurality of different groove sections among the first groove section, the second groove section, and the third groove section.

According to the present aspect, it is possible to easily realize a configuration in which the first movement section takes an inclined posture with respect to the liquid ejection surface in a case where the shutter is at the open position.

A fourth aspect is according to the third aspect, the open position of the shutter is located downstream in the medium transport direction with respect to the covering position, a transport roller pair that transports the medium downstream is provided downstream in the medium transport direction with respect to a position facing the liquid ejection head, and when the shutter is at the open position, the shutter overlaps with the transport roller pair in a normal line direction of the liquid ejection surface.

According to the present aspect, in a case where the shutter is at the open position, the shutter overlaps the transport roller pair in the normal line direction with respect to the liquid ejection surface, and thus it is possible to shorten the distance between the transport roller pair and the liquid ejecting head in the medium transport direction. By this, it is possible to suppress floating of the medium from the shutter during recording, and it is possible to obtain excellent recording quality. In addition, it is possible to suppress the size of the apparatus in the medium transport direction.

A fifth aspect is according to the first aspect, a transport roller pair that is positioned downstream in the medium transport direction with respect to a position facing the liquid ejection head, and that transports the medium downstream, a rotation shaft of a roller driven by a motor among the rollers constituting the transport roller pair, and a crank mechanism configured to move the shutter by transmitting rotation of the rotation shaft to the shutter, the crank mechanism being provided on both sides of the shutter in a width direction which is a direction intersecting a medium transport direction, wherein the crank mechanism includes a one-way clutch and when a rotation direction of the rotation shaft when the transport roller pair transports the medium downstream in the medium transport direction is defined as the first rotation direction, and a rotation direction opposite to the first rotation direction is defined as the second rotation direction, the one-way clutch does not transmit the rotation of the rotation shaft to the shutter when the rotation shaft rotates in the first rotation direction and when the rotation shaft rotates in the second rotation direction, transmits the rotation of the rotation shaft to the shutter.

According to the present aspect, since the shutter can be moved by using the reverse rotation operation of the transport roller pair, a dedicated power source for moving the shutter is not necessary. By this, the cost of the apparatus can be reduced, and an increase in the size of the apparatus can be suppressed.

Note that the present aspect is not limited to the first aspect and may be according to any of the second to fourth aspects.

A sixth aspect is according to the third aspect, a transport roller pair that is positioned downstream in the medium transport direction with respect to a position facing the liquid ejection head, and that transports the medium downstream, a rotation shaft of a roller driven by a motor among the rollers constituting the transport roller pair, and a crank mechanism configured to move the shutter by transmitting rotation of the rotation shaft to the shutter, the crank mechanism being provided on both sides of the shutter in the width direction, wherein the crank mechanism includes a first arm pivotably coupled to one guided section of the plurality of guided sections provided on a side section of the shutter in the width direction, a second arm pivotably coupled to the first arm, the second arm being pivotable with respect to the rotation shaft, and a one-way clutch interposed between the rotation shaft and the second arm, and when a rotation direction of the rotation shaft when the transport roller pair transports the medium downstream in the medium transport direction is defined as the first rotation direction, and a rotation direction opposite to the first rotation direction is defined as the second rotation direction, the one-way clutch does not transmit the rotation of the rotation shaft to the second arm when the rotation shaft rotates in the first rotation direction, when the rotation shaft rotates in the second rotation direction, transmits the rotation of the rotation shaft to the second arm.

According to the present aspect, since the shutter can be moved by using the reverse rotation operation of the transport roller pair, a dedicated power source for moving the shutter is not necessary. By this, the cost of the apparatus can be reduced, and an increase in the size of the apparatus can be suppressed.

A seventh aspect is according to the fifth or sixth aspect, a pressing section configured to press the shutter in a direction intersecting the movement direction is provided.

According to the present aspect, since the pressing section capable of pressing the shutter in the direction intersecting with the movement direction is provided, it is possible to suppress unintentional movement of the shutter due to vibration, impact, or the like.

An eighth aspect is according to the fifth or sixth aspect, a plurality of pressing sections configured to press the shutter in a direction intersecting the movement direction are provided at intervals in the width direction.

In the configuration in which the crank mechanisms are provided on both sides of the shutter in the width direction, a phase shift may occur between one crank mechanism and the other crank mechanism due to vibration or impact during transportation. When such a phase shift occurs, the rotation shaft cannot be rotated, that is, the shutter cannot be moved. Hereinafter, such a phenomenon is referred to as a deadlock of the shutter.

According to the present aspect, since the plurality of pressing sections that press the shutter in the direction intersecting the movement direction are provided at intervals in the width direction, it is possible to suppress a phase shift between one crank mechanism and the other crank mechanism. By this, the occurrence of the deadlock of the shutter can be suppressed.

A ninth aspect is according to the sixth aspect, it includes a motor that is a power source for the rotation shaft and a control section configured to control the motor, wherein the control section is configured to execute a control mode in which a predetermined amount of forward rotation operation and reverse rotation operation of the motor are repeatedly performed.

When a control mode in which a forward rotation operation and a reverse rotation operation of a predetermined amount of the motor are repeatedly performed is executed, the phase shift can be eliminated in some cases. According to the present aspect, since the control section can execute the control mode, it is possible to expect the elimination of the phase shift, and further, it is possible to expect the elimination of the deadlock of the shutter.

The present disclosure will be described in detail below.

Hereinafter, an inkjet printer 1 will be described as an example of a recording device that performs recording on a medium. Hereinafter, the inkjet printer 1 is simply referred to as printer 1.

In the X-Y-Z coordinate system shown in each drawing, the X-axis direction is the apparatus width direction, which is the width direction of the medium on which recording is performed. When viewed from the operator of the printer 1, the +X direction is the left side and the −X direction is the right side. Hereinafter, the X-axis direction may be referred to as a medium width direction or simply a width direction.

The Y-axis direction is the apparatus depth direction and is a direction along the medium transport direction during recording. The +Y direction is a direction from the rear surface to the front surface of the apparatus, and the −Y direction is a direction from the front surface to the rear surface of the apparatus. In present embodiment, among the side surfaces constituting the periphery of the printer 1, the side surface in the +Y direction is the apparatus front surface, and the side surface in the −Y direction is the apparatus rear surface.

The Z-axis direction is a direction along the vertical direction and is the apparatus height direction. The +Z direction is a vertically upward direction, and the −Z direction is a vertically downward direction.

Hereinafter, a direction in which a medium is fed may be referred to as "downstream", and a opposite direction may be referred to as "upstream".

Hereinafter, the medium transport path of the printer 1 will be described with reference to FIG. 1. As shown in FIG. 1, the printer 1 is provided with a medium accommodation cassette 2 at the bottom section of the apparatus. The reference numeral P indicates a medium stored in the medium accommodation cassette 2. An example of the medium is a recording sheet. The medium accommodation cassette 2 is provided so as to be attachable to and detachable from the front side of the apparatus.

A pickup roller 3 driven by a motor (not shown) is provided on the upper portion of the medium accommodation cassette 2. The pickup roller 3 is configured to advance and retreat with respect to the medium accommodated in the medium accommodation cassette 2 and sends out the medium from the medium accommodation cassette 2 in the +Y direction by rotating in contact with the medium accommodated in the medium accommodation cassette 2.

A feed roller 5 driven by a motor (not shown) and a separation roller 6 to which rotational torque is applied by a torque limiter (not shown) are provided downstream of the medium accommodation cassette 2. The medium fed from the medium accommodation cassette 2 is separated by being nipped by the feed roller 5 and the separation roller 6 and is further fed downstream.

An inversion roller 8 driven by a motor (not shown) is provided downstream of the feed roller 5 and the separation roller 6. The inversion roller 8 is provided with a first nip roller 9 and a second nip roller 10 around it, and the medium is nipped by the inversion roller 8 and the first nip roller 9, further nipped by the inversion roller 8 and the second nip roller 10 and transported. The transport direction of the medium is inverted from the +Y direction to the −Y direction by the inversion roller 8, and the medium is transported downstream.

A first transport roller pair 15 including a drive roller 16 driven by a motor (not shown) and a driven roller 17 which can be driven to rotate is provided downstream of the inversion roller 8. The medium is transported to a position facing a line head 40 by the first transport roller pair 15.

In addition to the medium feed path from the medium accommodation cassette 2, the printer 1 includes a medium feed path from a medium support section 12. The medium support section 12 supports the medium in an inclined posture, and the supported medium is transported to the first transport roller pair 15 by a feed roller 13 driven by a motor (not illustrated). Reference numeral 14 denotes a separation roller to which rotational torque is applied by a torque limiter (not shown).

A medium detection section 22 is provided upstream of the first transport roller pair 15. A control section 80 (refer to FIG. 5), which will be described later, can position the leading end of the medium with respect to the line head 40 based on the detection information of the medium detection section 22, and can position the medium at a recording start position, for example.

The line head 40 is an example of a liquid ejecting head that performs recording by ejecting ink, which is an example of a liquid, onto a medium. The line head 40 is a liquid ejecting head in which a plurality of nozzles 44 that eject ink are arranged so as to cover the entire area in the medium width direction. The line head 40 is elongated in the medium width direction and is configured as a liquid ejection head capable of recording on the entire medium width area without moving in the medium width direction.

Reference numeral 42*a* denotes a head surface that faces a medium. A head surface 42*a* can also be referred to as a liquid ejection surface or a nozzle surface. The head surface 42*a* is formed by a plate member 42 (see FIG. 2) which will be described later. The head surface 42*a* is parallel to the medium transport direction, that is, the Y-axis direction at a position facing the line head 40.

The printer 1 includes an ink container (not shown), and the ink ejected from the line head 40 is supplied from the ink container to the line head 40 via an ink tube (not shown).

A facing section 45 is provided at a position facing the head surface 42*a* of the line head 40. The facing section 45 according to the present embodiment includes a shutter 47 (shown in FIG. 5) which will be described later and defines a gap between the medium and the head surface 42*a* by supporting the medium using the shutter 47. Hereinafter, the gap between the facing section 45 and the head surface 42*a* may be referred to as a platen gap.

The line head 40 is provided so as to be movable in a direction of advancing and retreating with respect to the facing section 45, that is, in an adjustment direction of the platen gap. In the present embodiment, the adjustment direction of the platen gap is parallel to the Z-axis direction. Hereinafter, the movement of the line head 40 in the +Z axis direction may be referred to as "raising", and the movement of the line head 40 in the −Z axis direction may be referred to as "lowering".

Figure 4:
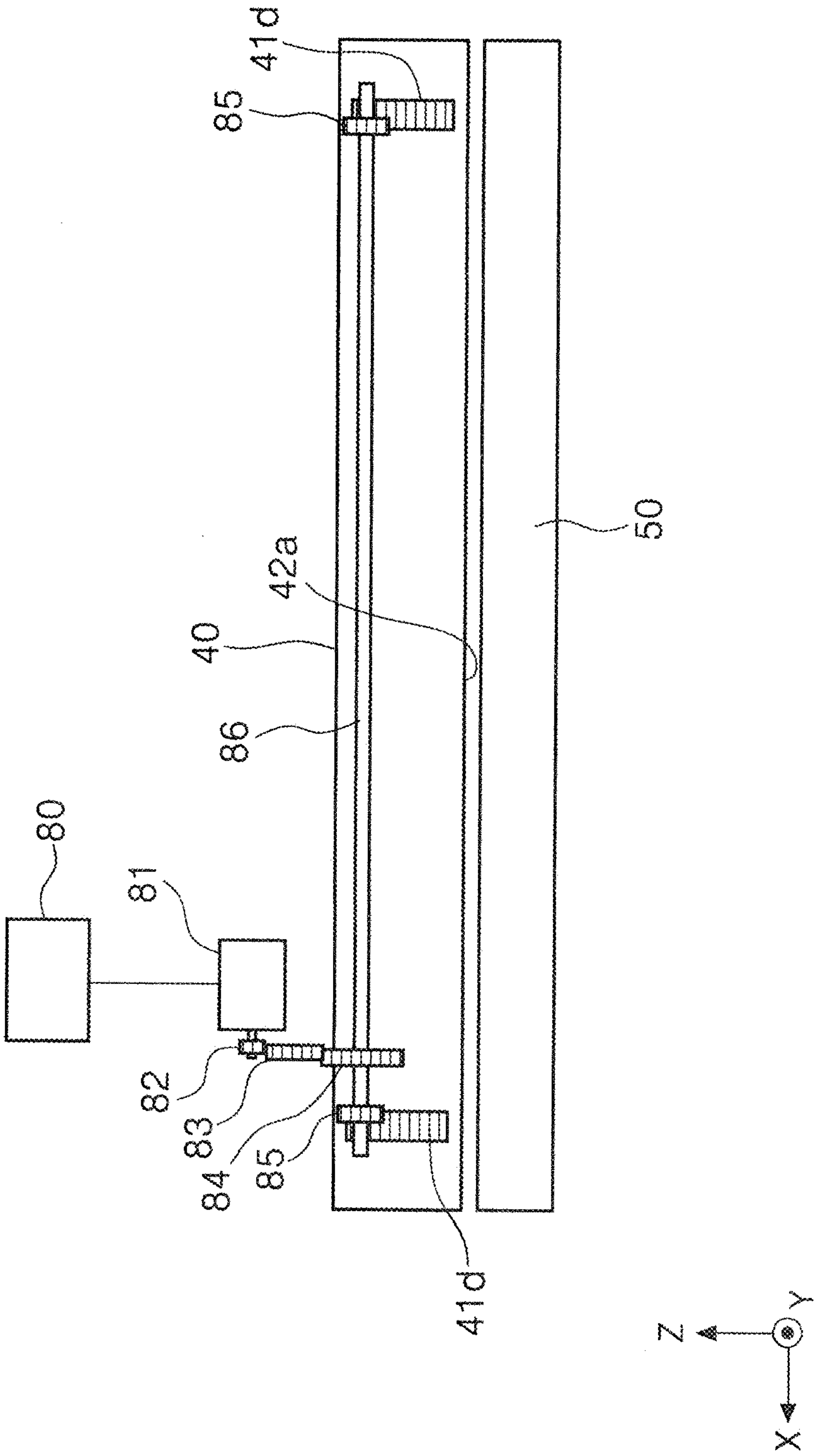
FIG. 4 is a view showing a drive mechanism for driving the line head.

FIG. 4 shows a platen gap adjustment mechanism, reference numeral 81 denotes a head movement motor which is a drive source for raising and lowering the line head 40, and reference numeral 80 denotes a control section which controls the head movement motor 81. The control section 80 is a control section that controls the entire printer 1.

A motor gear 82 is provided on a motor shaft of the head movement motor 81, and the motor gear 82 transmits a driving force to a pinion gear 85 via a gear 83 and a gear 84. The gear 84 and the pinion gear 85 are fixed to a shaft 86.

The line head 40 is held by a guide member (not shown) so as to be displaceable in the Z-axis direction. In the line head 40, a rack section 41*d* is formed along the Z-axis direction, and the pinion gear 85 meshes with the rack section 41*d* to constitute a rack and pinion mechanism.

The pinion gear 85 is rotated by the rotation of the head movement motor 81, and by this, the line head 40 moves up and down.

The rack and pinion mechanism constituted by the rack section 41*d* and the pinion gear 85 is provided in the vicinity of both end sections of the line head 40 in the medium width direction.

When the line head 40 is raised, the line head 40 comes into contact with a raising restriction section (not shown), and further raising is restricted. The control section 80 can grasp that the line head 40 is positioned at the raising limit position by detecting an increase in the motor drive current value when the line head 40 abuts against the raising restriction section.

The head movement motor 81 is provided with an encoder sensor (not shown), and the control section 80 can detect the amount of rotation of the head movement motor 81. By this, the control section 80 can detect the movement amount of the line head 40 from the raising limit position, that is, can grasp the current position of the line head 40.

The control section 80 adjusts the platen gap by raising and lowering the line head 40 according to the thickness of the medium based on the medium type included in the received print data. For example, when the position of the line head 40 in a case where recording is performed on plain paper is a first recording position, when recording is performed on dedicated paper which is thicker than plain paper, the line head 40 is positioned at a second recording position which is higher than the first recording position.

Returning to FIG. 1, a second transport roller pair 19 is provided downstream of the line head 40, including a drive roller 20 which is driven by a motor (not shown) and a driven roller 21 which can be driven to rotate. The medium on which recording has been performed is transported downstream by the second transport roller pair 19.

A third transport roller pair 27 is provided downstream of the second transport roller pair 19, and a discharge roller pair 28 is provided downstream of the third transport roller pair 27. A portion between the third transport roller pair 27 and the discharge roller pair 28 is configured as a face down discharge path, and the medium on which recording has been performed is discharged to a discharge tray 29 by the discharge roller pair 28 in a state where the recent recording surface faces downward.

Next, the line head 40 and a cap unit 60 will be described with reference to FIGS. 2 and 3.

Figure 2:
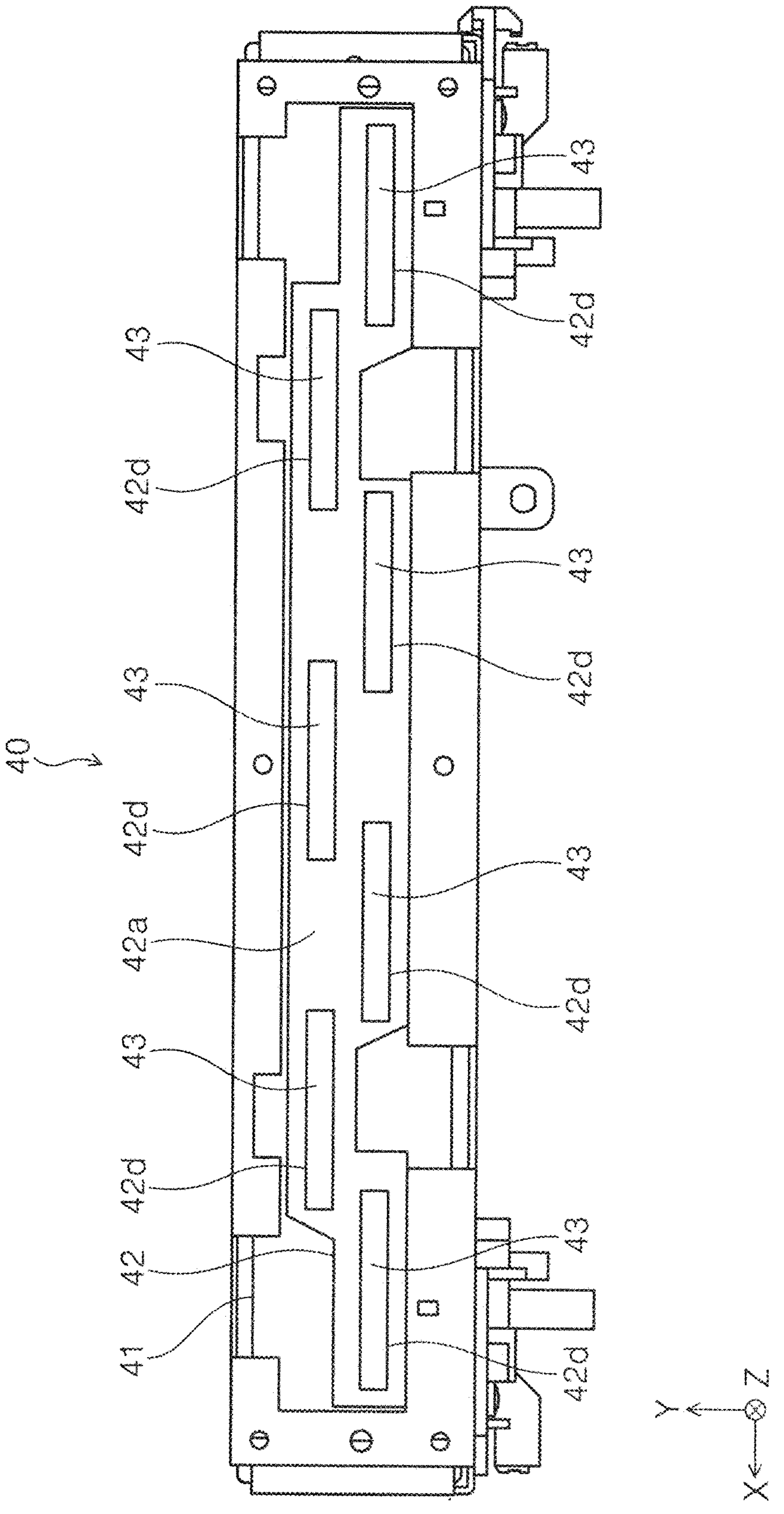
FIG. 2 is a plan view of the head surface.
Figure 3:
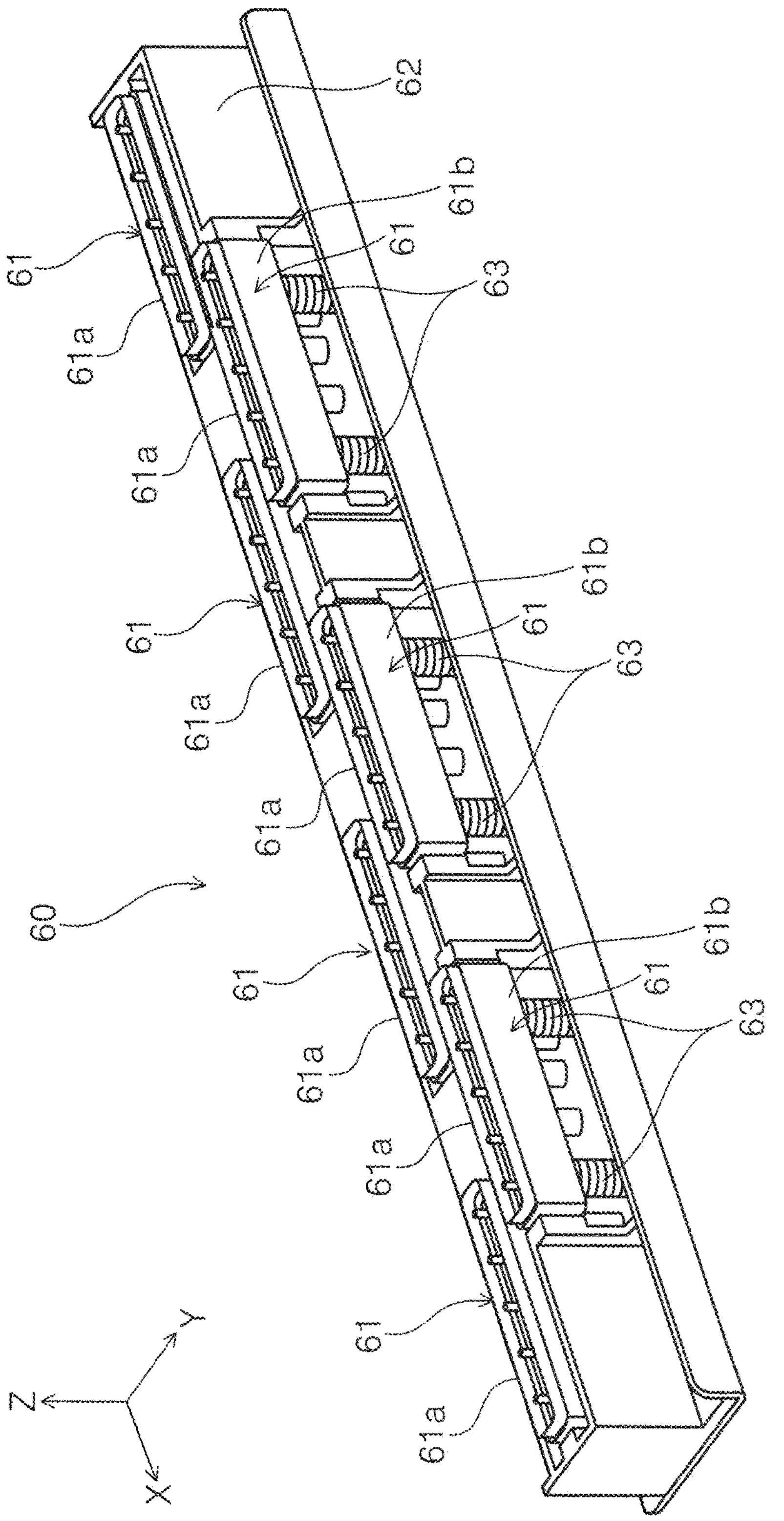
FIG. 3 is a perspective view of a cap unit.

As shown in FIG. 2, the line head 40 includes the plate member 42 on a base 41. The base 41 is a structure in which a flow path for ink supplied from an ink container (not shown) to a head chip 43 is provided.

The plate member 42 is a metal plate and forms the head surface 42*a*.

A plurality of opening sections 42*d* are formed in the plate member 42, and the head chip 43 is provided in each opening section 42*d*. The plurality of nozzles 44 (shown in FIG. 1) are provided in the head chip 43 along the medium width direction. The plate member 42 and the head chip 43 are provided so as to be flush with each other.

The head chip 43 is alternately located on an upstream position and a downstream position along the X-axis direction, that is, the medium width direction. In the present embodiment, three head chips 43 are provided along the medium width direction at the upstream position, and four head chips 43 are provided along the medium width direction at the downstream position. By this, cap sections 61, which will be described later, that cover the head chips 43 are alternately located on the upstream position and the downstream position along the medium width direction.

Next, the cap section 61 that covers the head chip 43 will be described with reference to FIG. 3. Since the head chip 43 is provided on the head surface 42*a*, the cap section 61 can also be referred to as a member that covers a part of the head surface 42*a*. Since the nozzle 44 is provided in the head chip 43, the cap section 61 can also be referred to as a member which covers the nozzle 44.

The plurality of cap sections 61 constitutes the cap unit 60. The cap unit 60 is provided on the lower side of the facing section 45 (see FIGS. 8 to 12).

The cap unit 60 includes the plurality of cap sections 61 on a base section 62.

The cap section 61 has a shape elongated in the X-axis direction and includes a cap main body section 61*b* formed of a resinous material or the like, and an elastic section 61*a* which is a portion in contact with the head surface 42*a* and is formed of an elastic material such as rubber. The cap main body section 61*b* is held by the base section 62 so as to be displaceable in the Z-axis direction, and a movement limit in the +Z direction is defined by a restriction section (not shown) formed on the base section 62. The cap main body section 61*b* is pressed in the +Z direction by a cap spring 63, which is an example of a pressing member. In the present embodiment, two cap springs 63 are provided for one cap main body section 61*b*.

A waste liquid tube (not shown) is coupled to each cap main body section 61*b*. The waste liquid tube is coupled to a pump (not shown). When the pump is operated in a state where the cap section 61 covers the head surface 42*a*, a negative pressure is generated in the cap section 61, and by this, the ink is sucked from the nozzle 44 of the line head 40.

The cap sections 61 are alternately located in an upstream position and a downstream position along the X-axis direction, that is, the medium width direction. In the present embodiment, three cap sections 61 are located on the upstream position, that is, in the +Y direction, and four cap sections 61 are located on the downstream position, that is, in the −Y direction.

Such an arrangement of the cap section 61 corresponds to the arrangement of the head chip 43 in the line head 40.

The cap section 61 is exposed by moving the shutter 47, which will be described later, from a covering position to an open position. That is, the facing section 45 facing the line head 40 is provided with the shutter 47, an opening section 45*a* (refer to FIGS. 10 and 11) is formed in the facing section 45 by moving the shutter 47 from the covering position to the open position, and the cap section 61 is exposed through the opening section 45*a*. The cap section 61 is arranged inside the opening section 45*a*.

Figure 11:
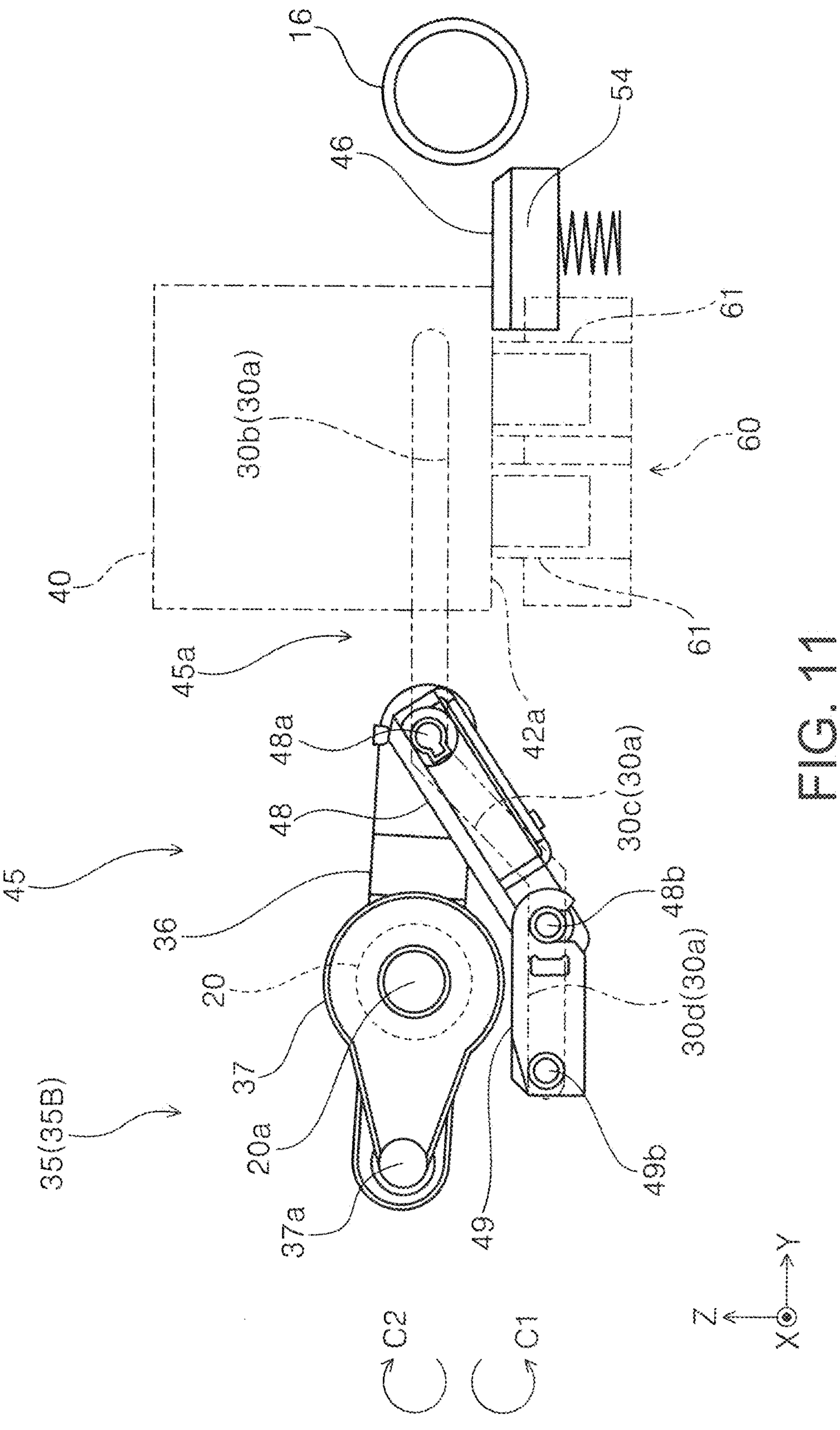
FIG. 11 is a side view of the shutter in a state in which the shutter is in an open position and the line head has advanced into the cap section.
Figure 12:
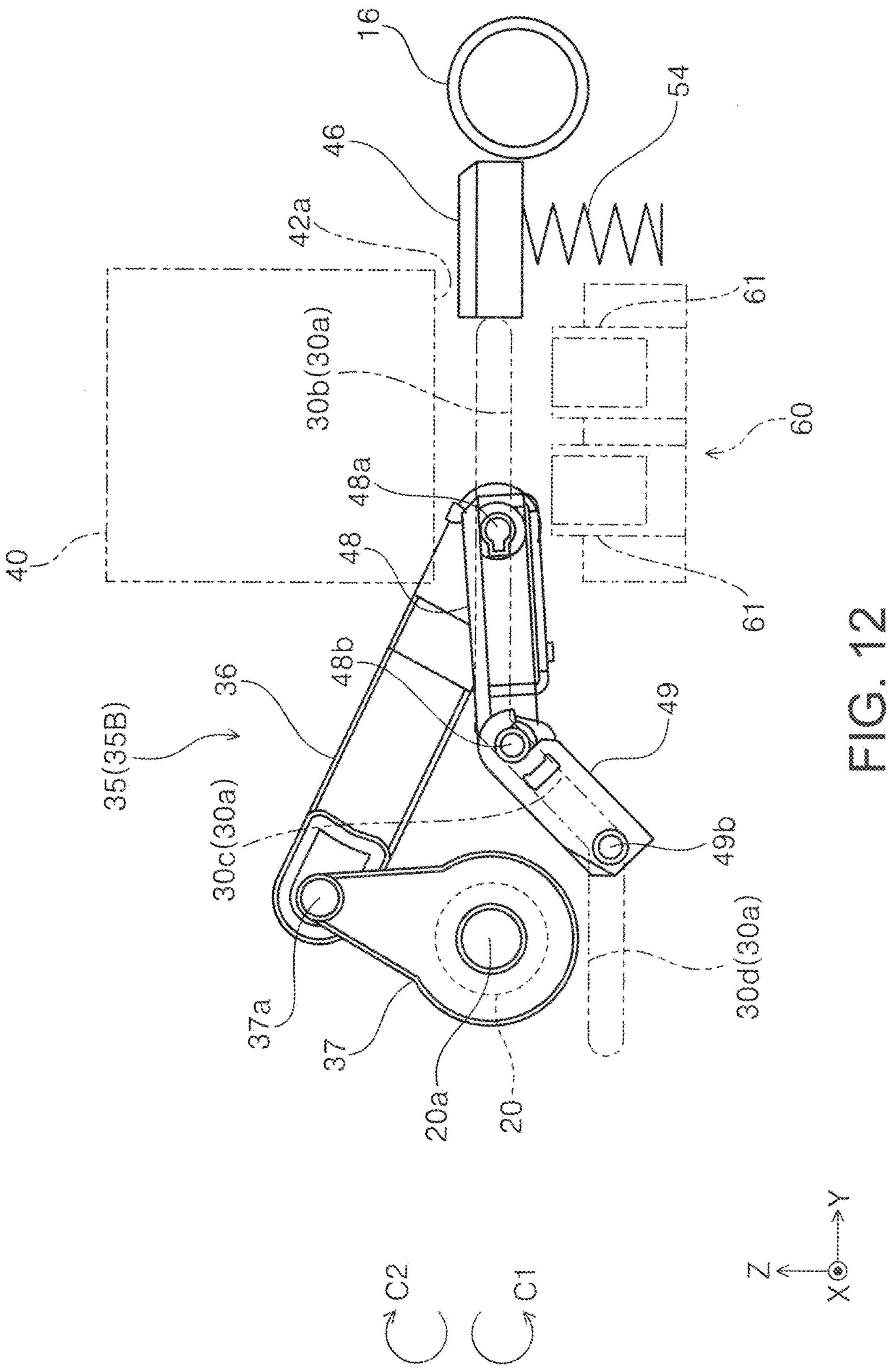
FIG. 12 is a side view of the shutter in the process of moving on the way from the open position to the covering position.

When the line head 40 lowers in a state where the shutter 47 is at the open position, the cap section 61 can cover the head chip 43 (refer to FIG. 11). At this time, the cap section 61 is slightly pressed down in the −Z direction against the pressing force of the cap spring 63, and by this, the elastic section 61*a* comes into close contact with the head surface 42*a*.

The control section 80 sets a state in which the head chip 43 is covered by the cap section 61 in a state in which the shutter 47, which will be described later, is set to an open position in a recording standby state at the time of power-off or power-on of the apparatus. The control section 80 ejects ink toward the cap section 61 in a state where the shutter 47 which will be described later is set to an open position at the time of a flushing operation for preventing clogging of the nozzle 44.

When the control section 80 receives the record data and performs recording, the control section 80 raises the line head 40 to separate the head surface 42*a* from the cap section 61, and moves the shutter 47, which will be described later, to a covering position. By this, it is possible to prevent the transported medium from entering the opening section 45*a* (refer to FIGS. 10 and 11) of the facing section 45 and to prevent the posture of the medium from being disturbed. In addition, it is possible to suppress a situation in which foreign matter such as paper dust enters the cap section 61 during the transport of the medium and the performance of the cap section 61 is impaired.

Next, the shutter 47 included in the facing section 45 will be described.

Figure 5:
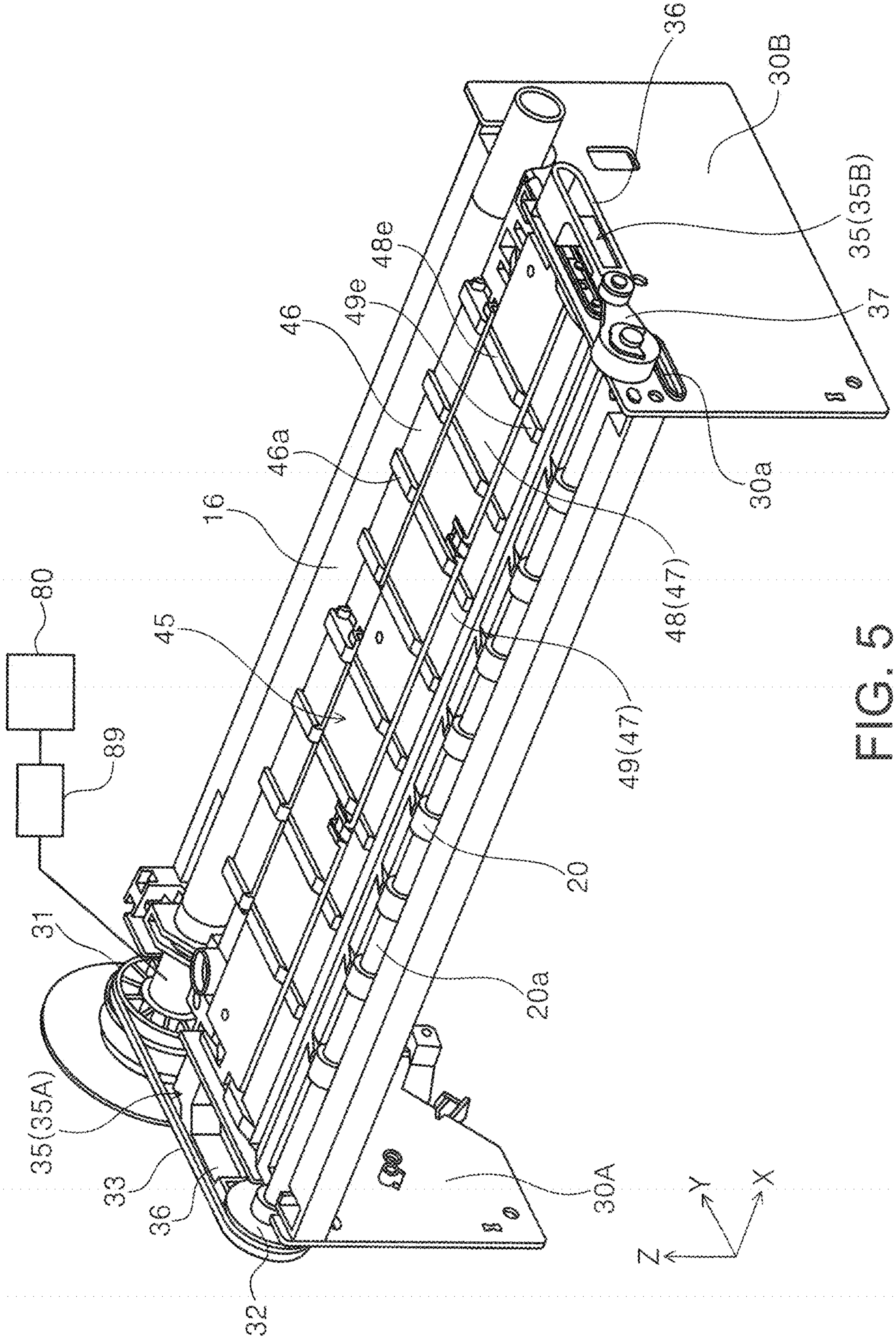
FIG. 5 is a perspective view of the facing section when the shutter is in the covering position.

As shown in FIG. 5, the facing section 45 includes a guide member 30A and a guide member 30B positioned separated from the guide member 30A by a space in the +X direction. The facing section 45 includes an upstream support section 46, the shutter 47, and a downstream support section 50 in the guide member 30A. The upstream support section 46, the shutter 47, and the downstream support section 50 are sections that support the medium in the facing section 45.

As will be described later, the shutter 47 is movable along the Y-axis direction, which is the medium transport direction. The upstream support section 46 is provided so as to be movable along the Z-axis direction, but not along the Y-axis direction.

In the upstream support section 46, a plurality of ribs 46*a* extending in the Y-axis direction, which is the medium transport direction, are provided at intervals along the X-axis direction, which is the medium width direction.

The shutter 47 includes a first movement section 48 and a second movement section 49. In the first movement section 48, a plurality of ribs 48*e* extending in the Y-axis direction are provided at intervals along the X-axis direction. In the second movement section 49, a plurality of ribs 49*e* extending in the Y-axis direction are provided at intervals along the X-axis direction.

The ribs 46*a*, 48*e*, and 49*e* are continuous along the Y-axis direction. The medium to be transported is supported by these ribs 46*a*, 48*e*, and 49*e*.

Figure 6:
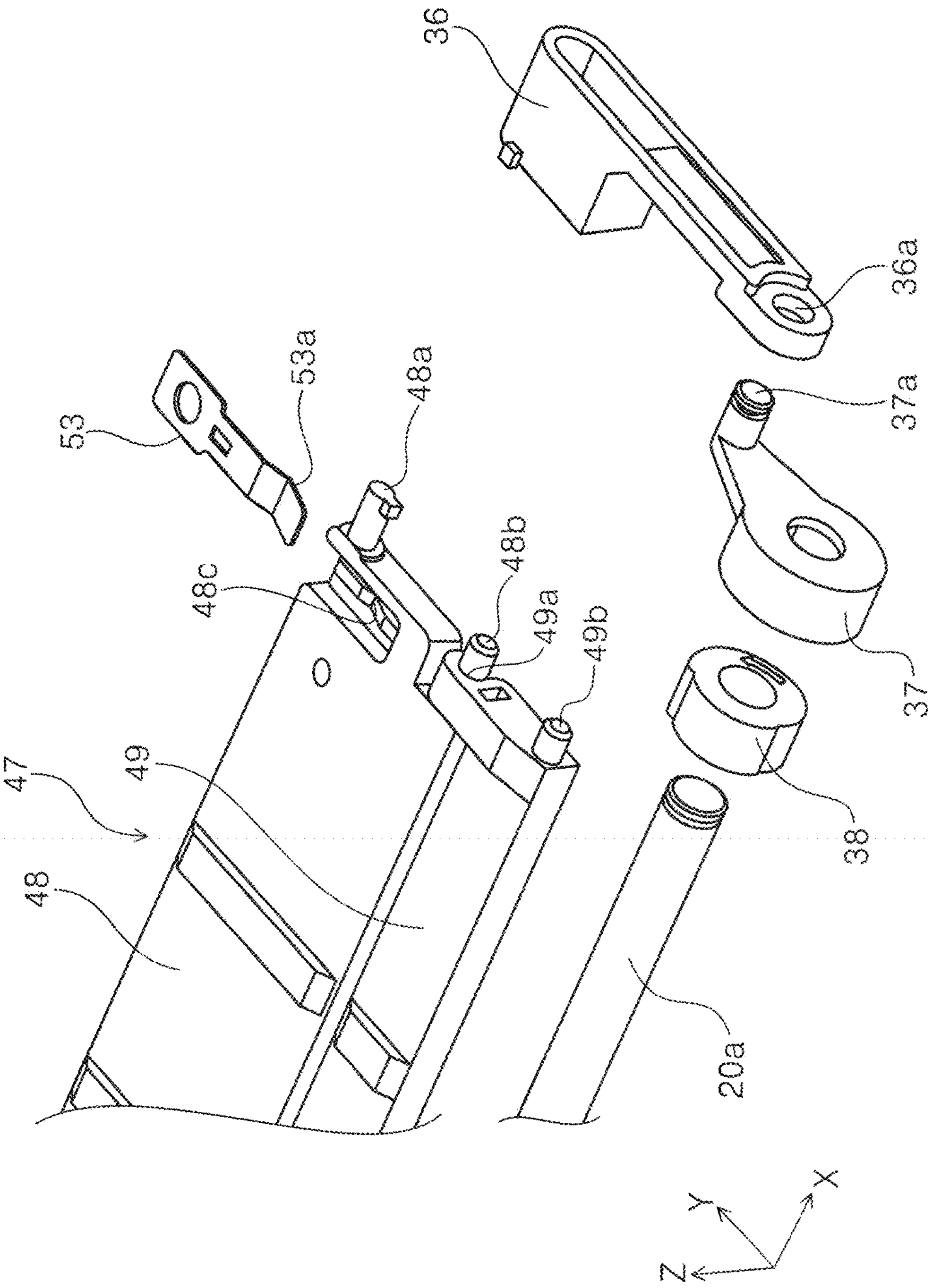
FIG. 6 is an exploded perspective view of the crank mechanism.

The first movement section 48 and the second movement section 49 constituting the shutter 47 are pivotably coupled to each other. FIG. 6 is an exploded perspective view showing the configuration of the shutter 47 in the +X direction. Although the configuration of the shutter 47 in the −X direction is not shown, it is the same as the configuration shown in FIG. 6. Specifically, the configuration of the shutter 47 in the −X direction is obtained by making the configuration of the shutter 47 in the +X direction line-symmetric with the Y-axis as the axis of symmetry at the center position of the shutter 47 in the X-axis direction.

Guided sections 48*a* and 48*b* are provided on the first movement section 48 so as to protrude outward in the medium-width direction. The guided section 48*b* is positioned in the −Y direction with respect to the guided section 48*a*.

A guided section 49*b* is provided on the second movement section 49 so as to protrude outward in the medium-width direction.

An engagement hole 49*a* is formed in the second movement section 49, and the guided section 48*b* of the first movement section 48 enters the engagement hole 49*a*, whereby the first movement section 48 and the second movement section 49 are pivotably coupled to each other. Here, the pivoting is pivoting in the Y-Z plane.

Returning to FIG. 5, the guide members 30A and 30B are provided with a guide groove 30*a* for guiding the guided sections 48*a* and 48*b* of the first movement section 48 and the guided section 48*b* of the second movement section 49 along the Y-axis direction.

As shown in FIGS. 8 to 12, the guide groove 30*a* has a first groove 30*b* extending parallel to the Y-axis direction. In addition, the guide groove 30*a* includes a second groove 30*c* that is positioned on the downstream side of the first groove 30*b* in the medium transport direction and that extends in a direction inclined with respect to the Y-axis direction. In addition, the guide groove 30*a* includes a third groove 30*d* that is located downstream of the second groove 30*c* in the medium transport direction and that extends in parallel to the Y-axis direction.

Next, a crank mechanism 35 for moving the shutter 47 will be described.

The shutter 47 moves by receiving power from a rotation shaft 20*a* of the drive roller 20 constituting the second transport roller pair 19. The rotation shaft 20*a* rotates by receiving power from the drive roller 16 constituting the first transport roller pair 15.

In FIG. 5, reference numeral 89 denotes a roller drive motor, which is a power source of the drive roller 16. The roller drive motor 89 is controlled by the control section 80.

A drive pulley 31 is provided at the shaft end of the drive roller 16 in the −X direction, and a driven pulley 32 is provided at the shaft end of the rotation shaft 20*a* in the −X direction. An endless belt 33 is wound around the drive pulley 31 and the driven pulley 32. By this, the rotation shaft 20*a* is rotated by the power of the roller drive motor 89. The rotation direction of the rotation shaft 20*a* when the second transport roller pair 19 transports the medium downstream in the medium transport direction is referred to as the first rotation direction C1 (see FIGS. 8 to 12). A rotation direction opposite to the first rotation direction C1 is referred to as the second rotation direction C2 (see FIGS. 8 to 12).

The crank mechanism 35 transmits the rotation of the rotation shaft 20*a* to the shutter 47 to move the shutter 47. The crank mechanism 35 is provided on both sides of the shutter 47 in the X-axis direction. In FIG. 5, the crank mechanism 35 provided in the −X direction with respect to the shutter 47 is denoted by reference numeral 35A, and the crank mechanism 35 provided in the +X direction with respect to the shutter 47 is denoted by reference numeral 35B.

As shown in FIG. 6, the crank mechanism 35 has a first arm 36 that is pivotably coupled to the guided section 48*a*, which is one of a plurality of guided sections provided at the side portions of the shutter 47. The crank mechanism 35 includes a second arm 37, which is an arm pivotably coupled to the first arm 36 and which is pivotable with respect to the rotation shaft 20*a*. The crank mechanism 35 further includes a one-way clutch 38 interposed between the rotation shaft 20*a* and the second arm 37.

The first arm 36 has an engagement hole 36*a*. The second arm 37 has a boss 37*a*. When the boss 37*a* enters into the engagement hole 36*a*, the first arm 36 and the second arm 37 are pivotably coupled to each other. Here, the pivoting is pivoting in the Y-Z plane.

When the rotation shaft 20*a* rotates in the first rotation direction C1, the one-way clutch 38 does not transmit the rotation of the rotation shaft 20*a* to the second arm 37. When the rotation shaft 20*a* rotates in the second rotation direction C2, the one-way clutch 38 transmits the rotation of the rotation shaft 20*a* to the second arm 37.

When the rotation shaft 20*a* rotates in the second rotation direction C2, the second arm 37 rotates integrally with the rotation shaft 20*a*. When the second arm 37 rotates, the first arm 36 moves along the Y-axis direction, and the first movement section 48 engaged with the first arm 36, that is, the shutter 47, moves along the Y-axis direction.

When the rotation shaft 20*a* rotates in the first rotation direction C1, the rotation of the rotation shaft 20*a* is not transmitted to the second arm 37, and thus the shutter 47 can be maintained in the stopped state, in particular, the covering state when the medium is transported downstream.

Figure 8:
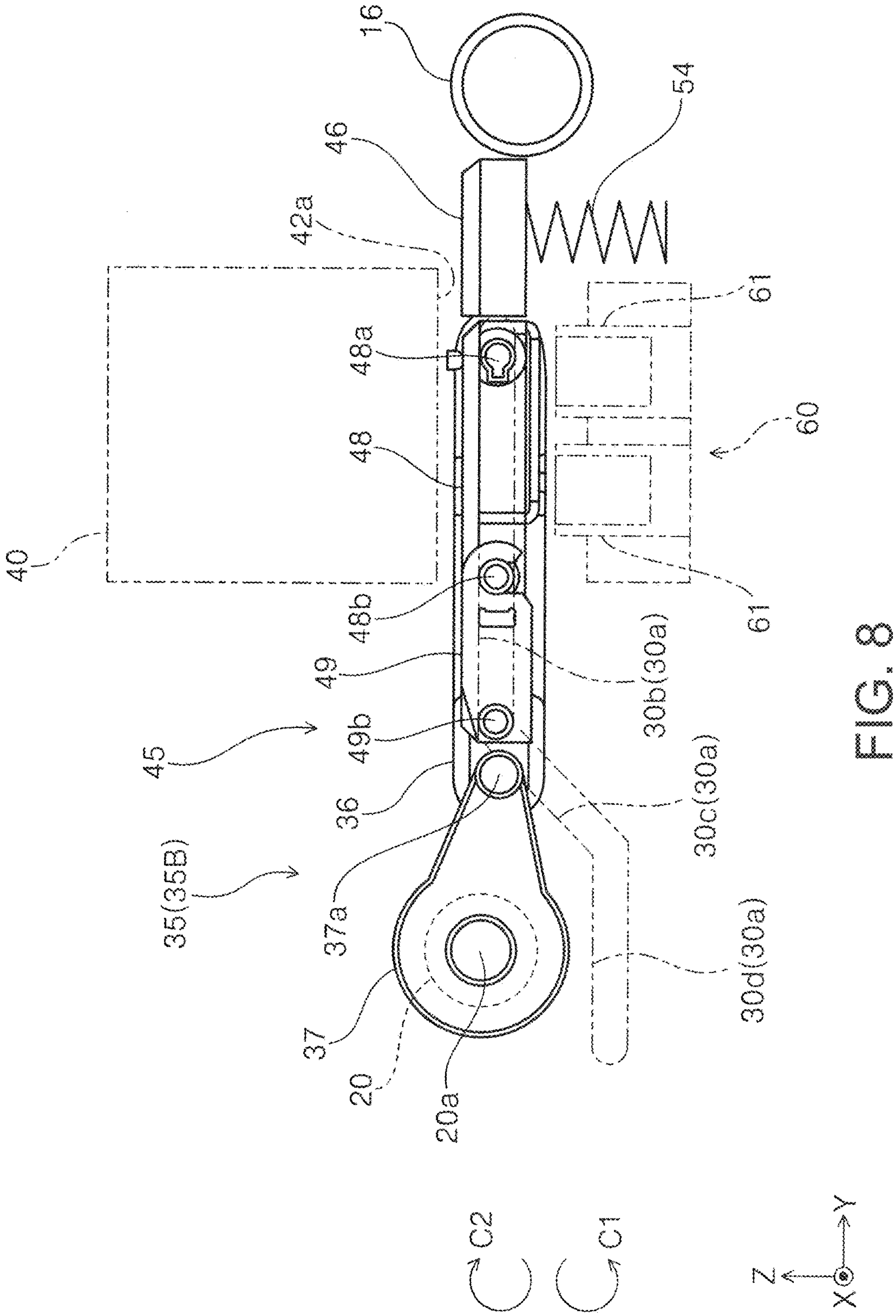
FIG. 8 is a side view of the shutter, showing the shutter in the state in the covering position.

FIG. 8 shows a state in which the shutter 47 is in the closed position. In this state, the guided sections 48*a*, 48*b*, and 49*b* are positioned in the first groove 30*b*.

The upstream support section 46 is provided so as to be movable in the Z-axis direction and is pressed in the +Z direction by a coil spring 54, which is an example of a pressing member.

Figure 9:
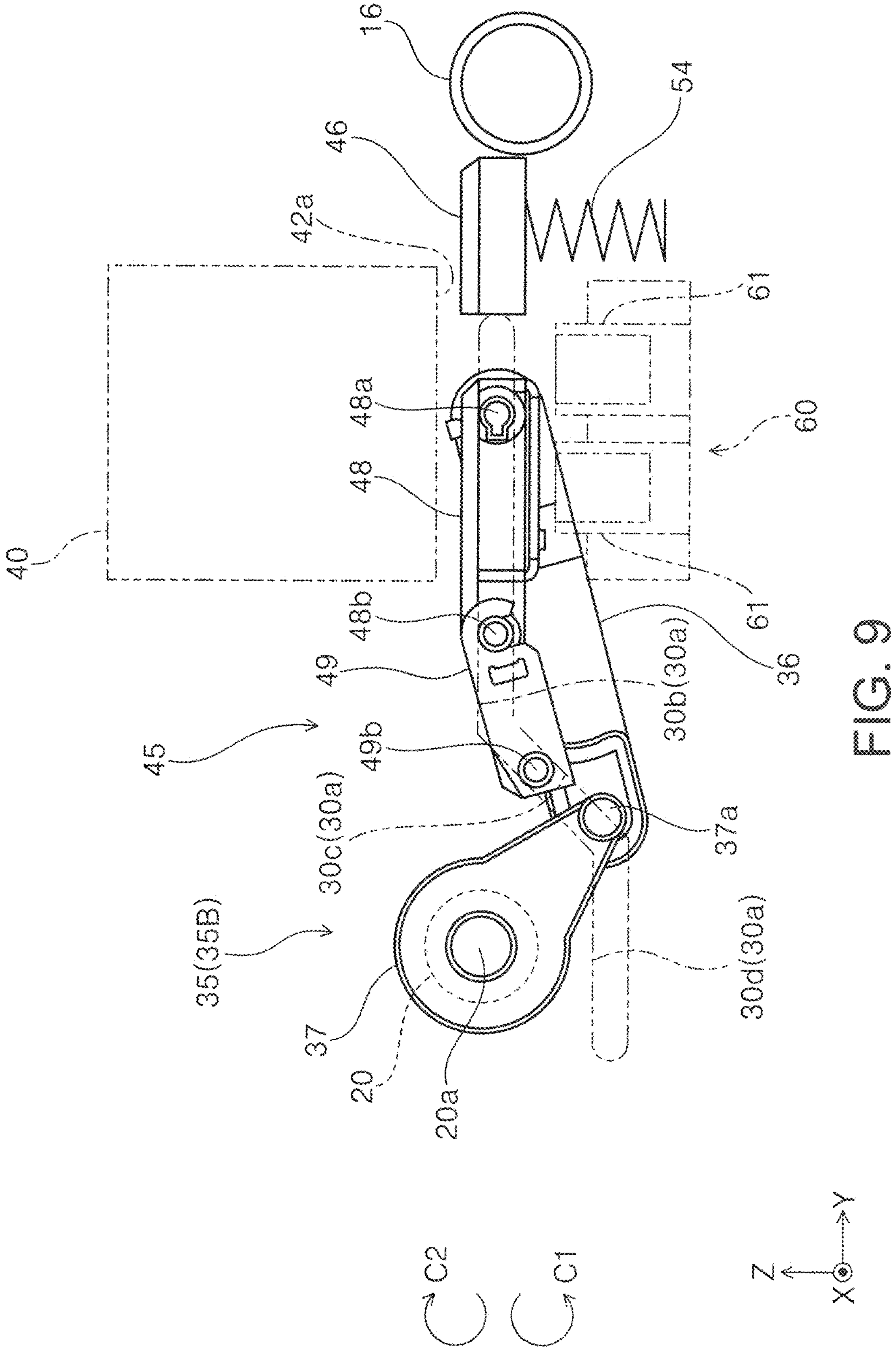
FIG. 9 is a side view of the shutter, the shutter being in the process of moving from the covering position to the open position.
Figure 10:
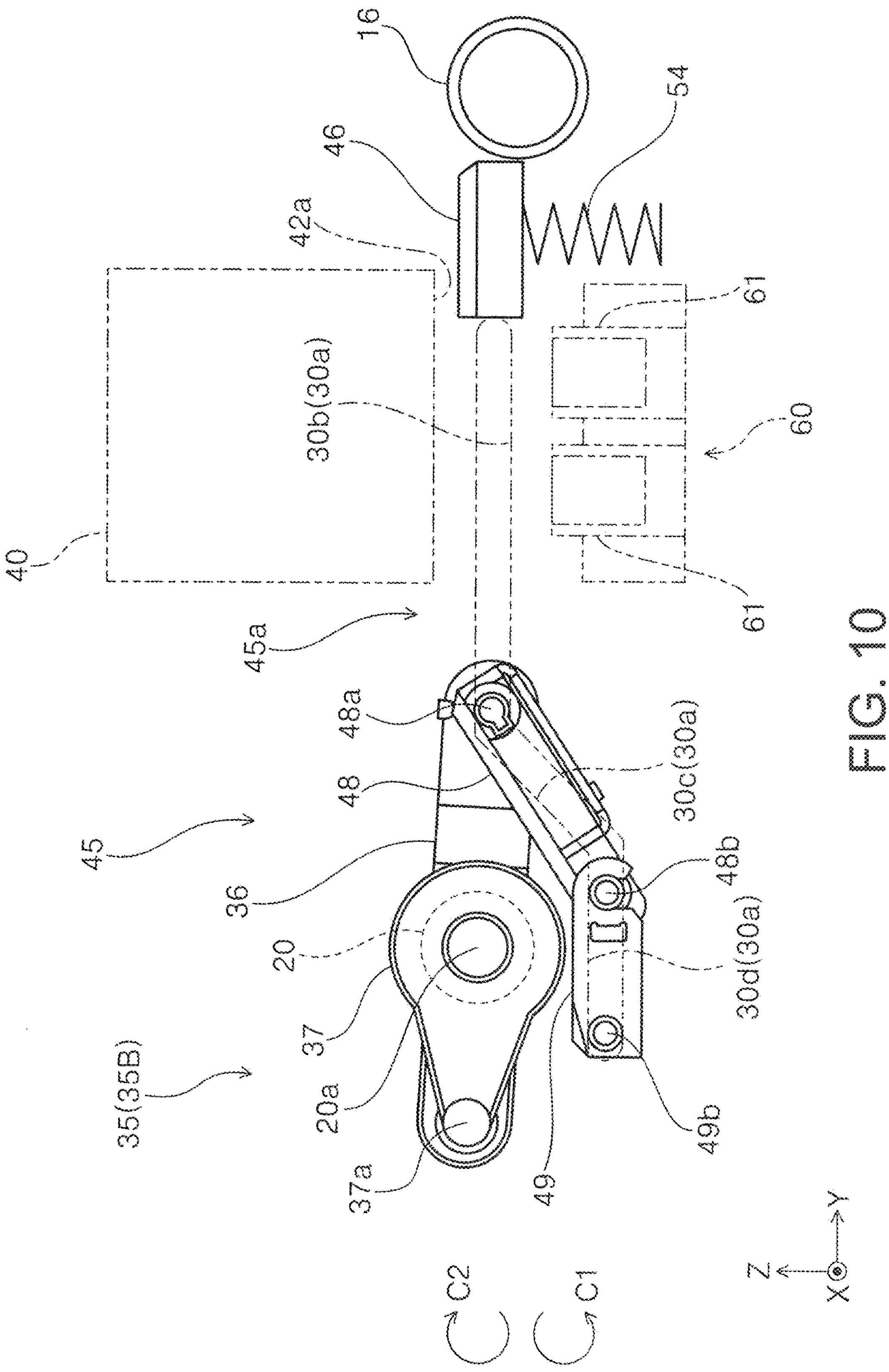
FIG. 10 is a side view of the shutter in a state in which the shutter is in an open position and the line head is separated from the cap section.

When the rotation shaft 20*a* rotates in the second rotation direction C2 from this state, the shutter 47 moves to the open position shown in FIG. 10 via the state shown in FIG. 9. In present embodiment, the open position of the shutter 47 is a position where the rotation shaft 20*a* is rotated 180° in the second rotation direction C2 from the covering position shown in FIG. 8.

In the process of the movement of the shutter 47 from the covering position to the open position, the guided sections 48*b* and 49*b* enter into the third groove 30*d* via the second groove 30*c*. The guided section 48*a* moves in the −Y direction in the first groove 30*b*.

When the shutter 47 moves from the covering position to the open position, the opening section 45*a* is formed in the facing section 45 as illustrated in FIG. 10. In this state, when the line head 40 lowers as shown in FIG. 11, the cap section 61 comes into contact with the head surface 42*a* of the line head 40 and covers the head chip 43. At this time, the line head 40 pushes down the upstream support section 46 in the −Z direction against the pressing force of the coil spring 54.

In a case where the shutter 47 is to be moved from the open position to the covering position from the state of FIG. 11, the line head 40 is raised, and then the rotation shaft 20*a* is rotated in the second rotation direction C2. By this, the shutter 47 moves to the covering position shown in FIG. 8 via the state shown in FIG. 12.

Figure 7:
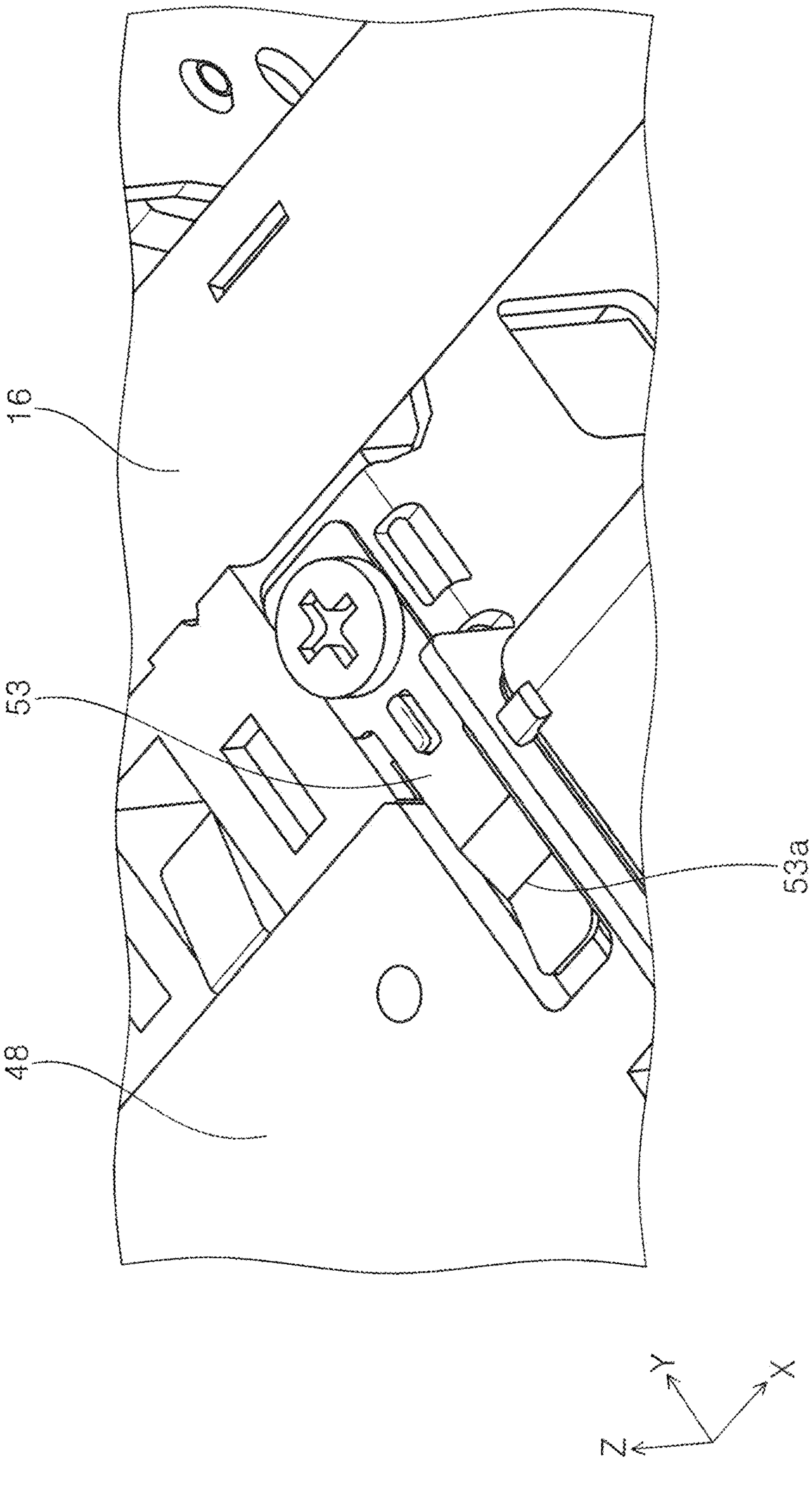
FIG. 7 is a perspective view of a leaf spring.

As shown in FIGS. 6 and 7, the facing section 45 is provided with a leaf spring 53 which is an example of a pressing section capable of pressing the shutter 47 in a direction intersecting the movement direction. The leaf spring 53 has a protrusion section 53*a* and is engageable with a recess section 48*c* formed in the first movement section 48 when the shutter 47 is at the covering position. Note that the protrusion section 53*a* may press the recess section 48*c* in the −Z direction, that is, in a direction intersecting the movement direction of the shutter 47, in a state in which the protrusion section 53*a* is fitted in the recess section 48*c*. Alternatively, although the protrusion section 53*a* does not press the recess section 48*c* in a state where the protrusion section 53*a* is fitted into the recess section 48*c*, it may be configured so that the protrusion section 53*a* presses a portion in the +Y direction with respect to the recess section 48*c* when the shutter 47 moves in the −Y direction.

In this way, since the leaf spring 53 can press the shutter 47 in the direction intersecting the movement direction, it is possible to suppress the shutter 47 from unintentionally moving from the covering position due to vibration, impact, or the like.

The pressing section capable of pressing the shutter 47 in the direction intersecting with the movement direction may press the shutter 47 in the direction along the X-axis direction.

In addition, a member that presses the first arm 36 or the second arm 37 in a direction including an X-axis direction component may be adopted as a restricting unit that restricts movement of the shutter 47 in the covering position.

In the present embodiment, a plurality of leaf springs 53, that is, pressing sections for pressing the shutter 47 in the direction intersecting the movement direction, are provided separated by a space in the width direction. Specifically, the leaf springs 53 are provided at an end section in the +X direction and an end section in the −X direction with respect to the first movement section 48 in the width direction. By this, the following operational effects can be obtained.

In the configuration where crank mechanisms 35 are provided on both sides of the shutter 47 in the width direction, there is a possibility that a phase shift may occur between one crank mechanism 35A and the other crank mechanism 35B due to vibration or impact during transportation. If such a phase shift occurs, the rotation shaft 20*a* cannot be rotated, that is, the shutter 47 cannot be moved. That is, there is a risk that the deadlock of the shutter 47 occurs.

However, by providing a plurality of pressing sections for pressing the shutter 47 in the direction intersecting the movement direction at intervals in the width direction, it is possible to suppress the phase shift between the one crank mechanism 35A and the other crank mechanism 35B. By this, the occurrence of deadlock of the shutter 47 can be suppressed.

The rotation angle of the rotation shaft 20*a* per unit movement amount of the shutter 47 is minimized when the first arm 36 is parallel to the movement direction of the shutter 47 as shown in FIG. 11. In other words, this state is a state in which the difference between the position of the end section of the shutter 47 in the −X direction and the position of the end section of the shutter 47 in the −X direction is likely to increase, and when the printer 1 is transported in this state, the above-described deadlock is likely to occur due to vibration or impact. Therefore, when the shutter 47 is in the open position, the first arm 36 is preferably shifted from the state shown in FIG. 11 to some extent, for example, by about 20°.

The control section 80, which controls the roller drive motor 89 that is the power source for the rotation shaft 20*a*, may be configured to execute a control mode in which a predetermined amount of forward and reverse rotations of the roller drive motor 89 are repeatedly performed. By this, it can be expected that the phase shift is eliminated.

As described above, the shutter 47 includes a plurality of movement sections along the movement direction, and two adjacent movement sections are pivotably coupled to each other. Further, when the shutter 47 is in the open position, at least one movement section takes an inclined posture with respect to the head surface 42*a*. In the present embodiment, as shown in FIG. 10, the first movement section 48 takes an inclined posture with respect to the head surface 42*a*.

This makes it possible to reduce the space occupied by the shutter 47 in the direction parallel to the head surface 42*a*, that is, in the medium transport direction at the position facing the head surface 42*a*. As a result, it is possible to suppress an increase in size of the apparatus in the medium transport direction.

In the present embodiment, the plurality of moving sections includes the first movement section 48 and the second movement section 49, but the plurality of movement sections is not limited thereto and may include three or more movement sections.

In the present embodiment, when the shutter 47 is in the open position, the first movement section 48 takes an inclined posture with respect to the head surface 42*a*, and the second movement section 49 is parallel to the head surface 42*a*. By this, as compared to a configuration in which both the first movement section 48 and the second movement section 49 take the inclined posture with respect to the head surface 42*a*, it is possible to suppress the occupied space of the shutter 47 in the Z-axis direction, that is, the normal line direction with respect to the head surface 42*a*.

However, instead of the first movement section 48 or in addition to the first movement section 48, the second movement section 49 may take an inclined posture with respect to the head surface 42*a*.

The facing section 45 includes guide members 30A and 30B that guide the shutter 47 in the movement direction. The first movement section 48 includes the guided sections 48*a* and 48*b*, which are guided by the guide groove 30*a* formed in the guide members 30A and 30B on both side portions in the width direction. In addition, the second movement section 49 includes the guided section 49*b* which is guided by the guide groove 30*a* formed in the guide members 30A and 30B on both side portions in the width direction.

The guide groove 30*a* includes the first groove 30*b*, the second groove 30*c*, and the third groove 30*d* described above.

When the shutter 47 is in the open position, the guided section 49*b* of the second movement section 49 is positioned in the third groove 30*d*, and the guided sections 48*a* and 48*b* of the first movement section 48 are positioned separately in a plurality of different groove sections among the first groove 30*b*, the second groove 30*c*, and the third groove 30*d*. In the present embodiment, the guided section 48*a* is positioned in the first groove 30*b*, and the guided section 48*b* is positioned in the third groove 30*d*. By this, it is possible to easily realize a configuration in which the first movement section 48 takes an inclined posture with respect to the head surface 42*a* in a case where the shutter 47 is in the open position.

In addition, in the present embodiment, the open position of the shutter 47 is positioned on the downstream side in the medium transport direction with respect to the covering position. When the shutter 47 is in the open position, as shown in FIG. 10, the shutter 47 overlaps the drive roller 20 constituting the second transport roller pair 19 in the Z-axis direction, that is, in the normal line direction with respect to the head surface 42*a*. Specifically, when the shutter 47 is in the open position, the shutter 47 is positioned below the drive roller 20.

With such a configuration, it is possible to shorten the distance between the second transport roller pair 19 and the line head 40 in the medium transport direction. In addition, the path length between the first transport roller pair 15 and the second transport roller pair 19 can be suppressed. As a result, it is possible to suppress floating of the medium from the shutter 47 at the time of recording, and it is possible to obtain favorable recording quality. In addition, it is possible to suppress the size of the apparatus in the medium transport direction.

In the present embodiment, the crank mechanism 35 includes the one-way clutch 38. The one-way clutch 38 does not transmit the rotation of the rotation shaft 20*a* to the shutter 47 when the rotation shaft 20*a* rotates in the first rotation direction C1 and transmits the rotation of the rotation shaft 20*a* to the shutter 47 when the rotation shaft 20*a* rotates in the second rotation direction C2. With such a configuration, since the shutter 47 can be moved by using the reverse rotation operation of the second transport roller pair 19, a dedicated power source for moving the shutter 47 is not required. As a result, the cost of the apparatus can be reduced, and an increase in the size of the apparatus can be suppressed.

In the present embodiment, the crank mechanism 35 includes the first arm 36, the second arm 37, and the one-way clutch 38. However, the mechanism for converting the rotation of the rotation shaft 20*a* into the movement of the shutter 47 is not limited to such a configuration and may have any configuration.

A position detecting means for detecting the position of the shutter 47 may be provided. For example, a contact type sensor or a non-contact type sensor that detects the shutter 47 when the shutter 47 is located at the covering position may be provided. Such a position detecting means may be provided for the open position in addition to the covering position of the shutter 47 or may be provided for the open position instead of the covering position.

In addition to the position detecting means, a rotation detecting means for detecting the rotation of the roller drive motor 89, for example, a rotary encoder may be provided, and the current position of the shutter 47 may be grasped in combination with the position detecting means.

In order to grasp the current position of the shutter 47 as described above, it is necessary to accurately grasp the amount of rotation of the first arm 36. The rotation amount of the first arm 36 can be grasped by the rotary encoder, but there is a concern that the rotation amount of the first arm 36 may deviate from a target value due to a backlash of a mechanism that transmits driving from the roller drive motor 89 to the first arm 36 when the motor rotation direction is switched. Therefore, for example, when switching the shutter 47 from the covering position to the open position, first, the rotation shaft 20*a* in the stopped state rotates in the first rotation direction C1 to maximize the backlash. Next, the rotation shaft 20*a* is rotated by a predetermined amount in the second rotation direction C2 in consideration of the backlash. By this, the rotation amount of the first arm 36 can be set to the target value, and the shutter 47 can be accurately positioned at the open position.

Figure 13:
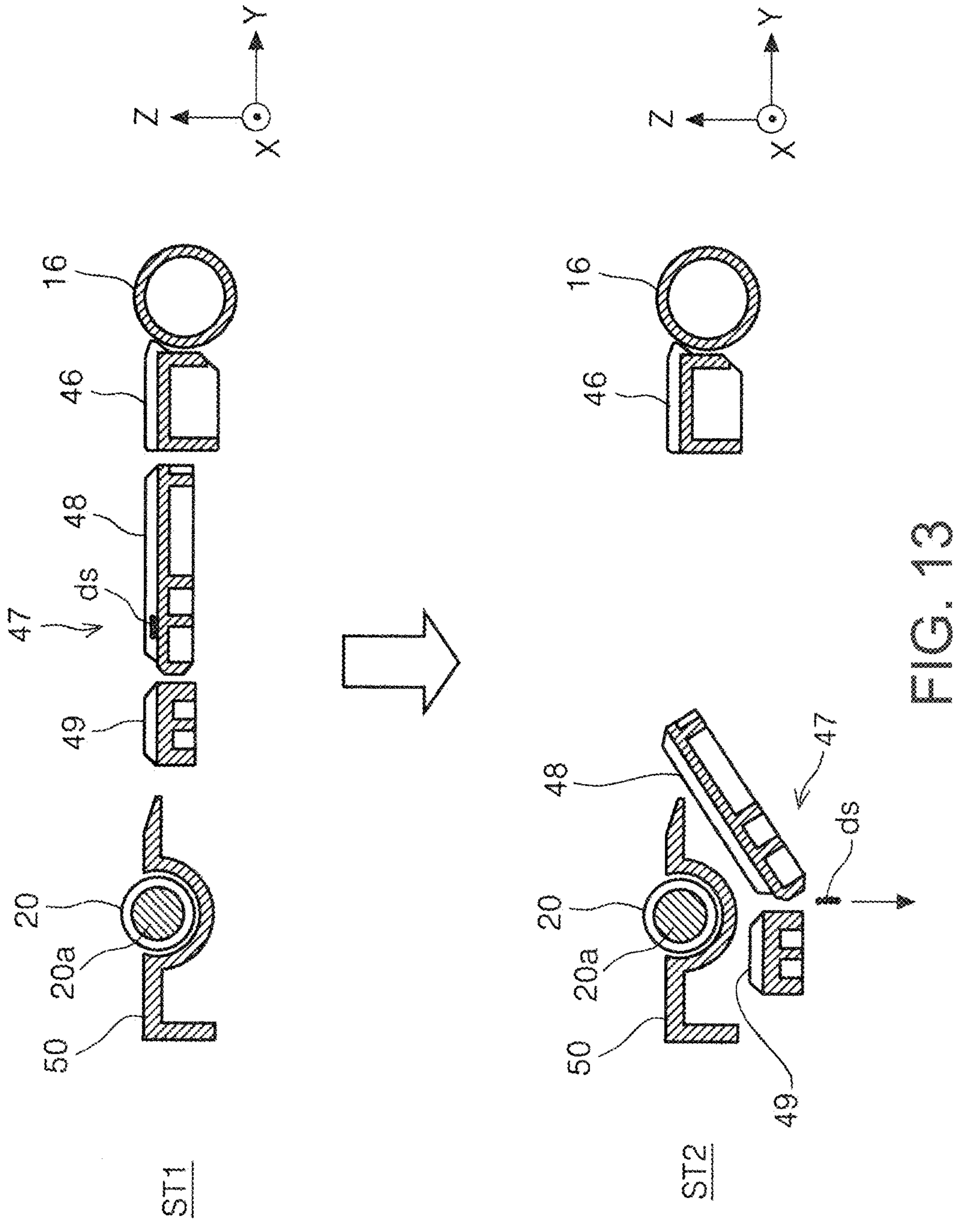
FIG. 13 is a side view of the shutter, showing a state change when the shutter moves from the covering position to the open position.

Hereinafter, other operational effects of the present embodiment will be described. In FIG. 13, a state ST1 is a state in which the shutter 47 is in the covering position, and a state ST2 is a state in which the shutter 47 is in the open position. In FIG. 13, reference numeral ds denotes a foreign matter such as paper dust placed on the first movement section 48. As indicated by the change from state ST1 to state ST2, when the shutter 47 moves from the covering position to the open position, the first movement section 48 takes the inclined posture, and thus the foreign matter ds slides down on the first movement section 48. As a result, it falls downward from the gap between the first movement section 48 and the second movement section 49. By this, the foreign matter ds can be removed. Note that the foreign matter ds may be a piece of paper, ink, or the like generated by the jam release work.

Figure 14:
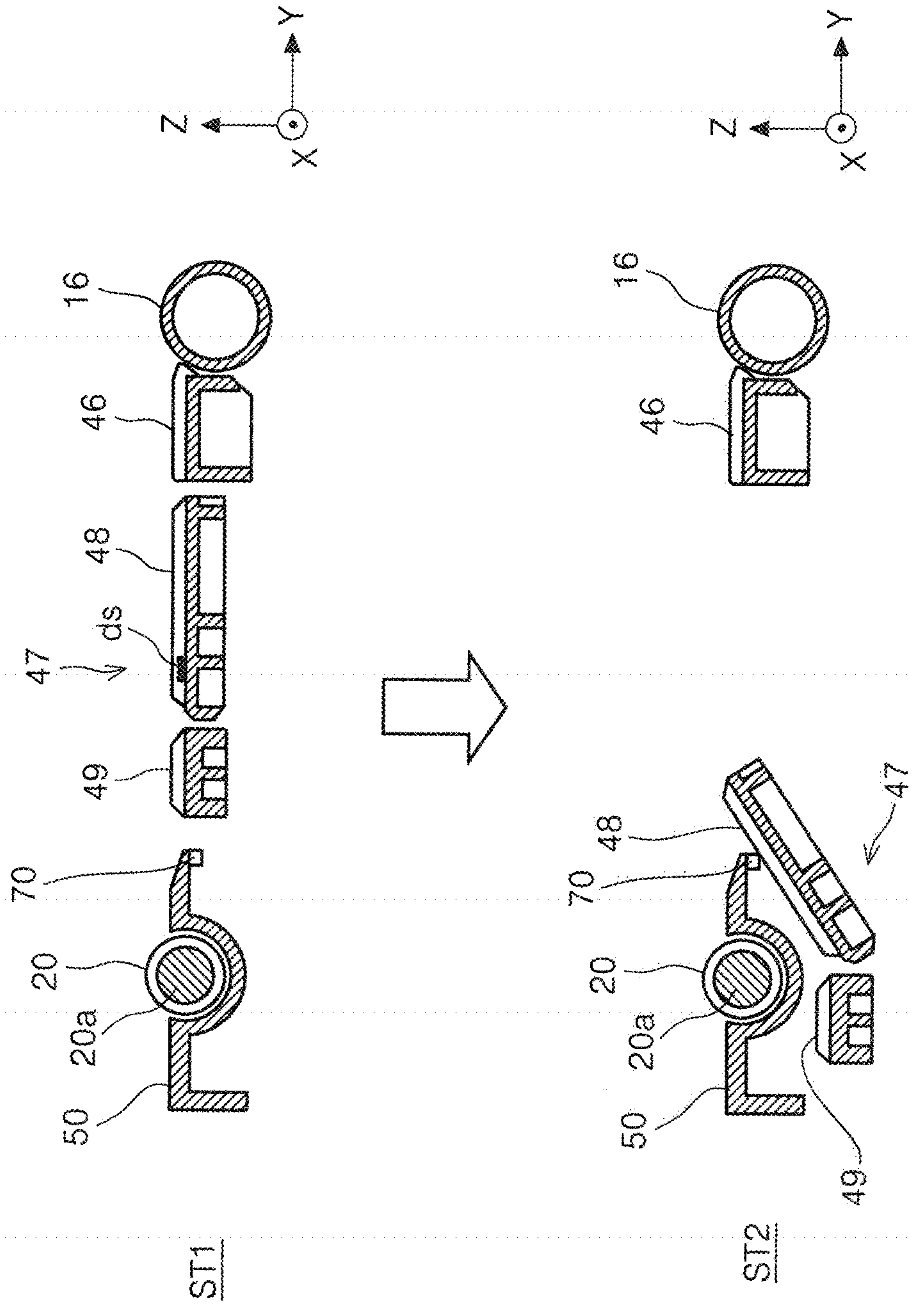
FIG. 14 is a side view of the shutter, showing a state change when the shutter moves from the covering position to the open position.

As another embodiment, as shown in FIG. 14, a cleaning member 70 may be provided on the downstream support section 50. When the shutter 47 moves between the covering position and the open position, the shutter 47 passes below the downstream support section 50. The cleaning member 70 is provided at a position where the cleaning member 70 can face the shutter 47 in the downstream support section 50. According to such a configuration, as shown by the change from the state ST1 to the state ST2 in FIG. 14, the ink adhering to the first movement section 48 can be wiped off by the cleaning member 70.

The present disclosure is not limited to the embodiments and the modifications described above, and various modifications can be made within the scope of the disclosure described in the claims, and it is needless to say that these are also included in the scope of the present disclosure.

What is claimed is:

1. A recording device comprising:

a liquid ejection head that performs recording by ejecting liquid onto a medium;

a facing section arranged to face the liquid ejection head, with an opening section formed at a position facing the liquid ejection head;

a cap section that is exposable through the opening section and that covers the liquid ejection surface of the liquid ejection head; and a shutter configured to move between a covering position at which the shutter covers the opening section and an open position at which the shutter opens the opening section, the shutter supporting a medium passing through a position facing the liquid ejecting head when the shutter is at the covering position, wherein the shutter includes a plurality of movement sections along a movement direction, and two adjacent movement sections are pivotably coupled to each other and when the shutter is in the open position, at least one of the movement sections takes an inclined posture with respect to the liquid ejection surface.

2. The recording device according to claim 1, wherein the plurality of movement sections includes a first movement section and a second movement section located downstream of the first movement section in the medium transport direction and when in the open position, the first movement section is in an inclined posture with respect to the liquid ejection surface, and the second movement section is parallel to the liquid ejection surface.

3. The recording device, according to claim 2, further comprising:

a guide member configured to guide the shutter in the movement direction, wherein the movement section includes a guided section guided by a guide groove formed in the guide member on both side sections in a width direction, which is a direction intersecting the medium transport direction, the guide groove includes a first groove section extending parallel to the liquid ejection surface, a second groove portion that is located downstream of the first groove section in the medium transport direction and that extends in a direction inclined with respect to the liquid ejection surface, and a third groove section that is located downstream of the second groove section in the medium transport direction and that extends parallel to the liquid ejection surface, the first movement section includes a plurality of the guided sections provided along the movement direction, and when the shutter is in the open position, the guided section provided to the second movement section is positioned in the third groove portion and the plurality of guided sections provided to the first movement section are separately positioned in different groove sections among the first groove section, the second groove section, and the third groove section.

4. The recording device according to claim 3, wherein the open position of the shutter is located downstream in the medium transport direction with respect to the covering position, a transport roller pair that transports the medium downstream is provided downstream in the medium transport direction with respect to a position facing the liquid ejection head, and when the shutter is at the open position, the shutter overlaps with the transport roller pair in a normal line direction of the liquid ejection surface.

5. The recording device, according to claim 3, further comprising:

a transport roller pair that is positioned downstream in the medium transport direction with respect to a position facing the liquid ejection head, and that transports the medium downstream, a rotation shaft of a roller driven by a motor among the rollers constituting the transport roller pair, and a crank mechanism configured to move the shutter by transmitting rotation of the rotation shaft to the shutter, the crank mechanism being provided on both sides of the shutter in the width direction, wherein the crank mechanism includes a first arm pivotably coupled to one guided section of the plurality of guided sections provided on a side section of the shutter in the width direction, a second arm pivotably coupled to the first arm, the second arm being pivotable with respect to the rotation shaft, and a one-way clutch interposed between the rotation shaft and the second arm, and when a rotation direction of the rotation shaft when the transport roller pair transports the medium downstream in the medium transport direction is defined as the first rotation direction, and a rotation direction opposite to the first rotation direction is defined as the second rotation direction, the one-way clutch does not transmit the rotation of the rotation shaft to the second arm when the rotation shaft rotates in the first rotation direction, transmits the rotation of the rotation shaft to the second arm when the rotation shaft rotates in the second rotation direction.

6. The recording device, according to claim 5, further comprising:

a motor that is a power source for the rotation shaft and a control section configured to control the motor, wherein the control section is configured to execute a control mode in which a predetermined amount of forward rotation operation and reverse rotation operation of the motor are repeatedly performed.

7. The recording device, according to claim 1, further comprising:

a transport roller pair that is positioned downstream in the medium transport direction with respect to a position facing the liquid ejection head, and that transports the medium downstream, a rotation shaft of a roller driven by a motor among the rollers constituting the transport roller pair, and a crank mechanism configured to move the shutter by transmitting rotation of the rotation shaft to the shutter, the crank mechanism being provided on both sides of the shutter in a width direction, which is a direction intersecting a medium transport direction, wherein the crank mechanism includes a one-way clutch and when a rotation direction of the rotation shaft when the transport roller pair transports the medium downstream in the medium transport direction is defined as the first rotation direction, and a rotation direction opposite to the first rotation direction is defined as the second rotation direction, the one-way clutch does not transmit the rotation of the rotation shaft to the shutter when the rotation shaft rotates in the first rotation direction and transmits the rotation of the rotation shaft to the shutter when the rotation shaft rotates in the second rotation direction.

8. The recording device, according to claim 7, further comprising:

a pressing section configured to press the shutter in a direction intersecting the movement direction.

9. The recording device, according to claim 7, further comprising:

a plurality of pressing sections configured to press the shutter in a direction intersecting the movement direction, separated by a space in the width direction.

* * * * *